(12) United States Patent
Kalampoukas et al.

(10) Patent No.: US 10,575,126 B2
(45) Date of Patent: Feb. 25, 2020

(54) APPARATUS AND METHOD FOR DETERMINING AUDIO AND/OR VISUAL TIME SHIFT

(71) Applicant: Alphonso Inc., Brick, NJ (US)

(72) Inventors: Lampros Kalampoukas, Brick, NJ (US); Daniel C. Sun, Bedminster, NJ (US)

(73) Assignee: Alphonso Inc., Mountain View, CA (US)

( * ) Notice: Subject to any disclaimer, the term of this patent is extended or adjusted under 35 U.S.C. 154(b) by 563 days.

(21) Appl. No.: 14/713,900

(22) Filed: May 15, 2015

(65) Prior Publication Data

US 2015/0332687 A1 Nov. 19, 2015

Related U.S. Application Data

(60) Provisional application No. 61/994,634, filed on May 16, 2014, provisional application No. 61/994,799, (Continued)

(51) Int. Cl.
*H04W 4/02* (2018.01)
*G06F 3/16* (2006.01)
(Continued)

(52) U.S. Cl.
CPC .......... *H04W 4/023* (2013.01); *G06F 3/165* (2013.01); *G06F 16/683* (2019.01);
(Continued)

(58) Field of Classification Search
USPC ........................................................ 704/211
See application file for complete search history.

(56) References Cited

U.S. PATENT DOCUMENTS

| 4,677,466 A | 6/1987 | Lert, Jr. et al. |
| 4,697,209 A | 9/1987 | Kiewit et al. |

(Continued)

FOREIGN PATENT DOCUMENTS

| EP | 2501144 A2 | 9/2012 |
| EP | 2501145 A2 | 9/2012 |
| EP | 2501146 A2 | 9/2012 |

OTHER PUBLICATIONS

Cano, P., Batlle, E., Kalker, T., and Haitsma, J., A Review of Algorithms, 2002 IEEE Workshop on Multimedia Signal Processing, Sep. 11, 2002; IEEE, pp. 169-173, USA.
(Continued)

*Primary Examiner* — Kevin Ky
(74) *Attorney, Agent, or Firm* — Panitch Schwarze Belisario & Nadel LLP (57) ABSTRACT

An system for determining time offset of an audio signature from a reference signature time stamp may have a server connected to one or more remote devices. The server may have a receiver connected to one of more communication channels configured to receive an audio signature generated by the remote device and transmitted over the communication channel. The system may have a database at or connected to the server that contains one or more reference audio signatures. Each of the reference audio signatures may have a time stamp also stored in the database. A query engine may compare the remote audio signature to one or more reference audio signatures stored in the database. A processor may be provided to compare a reference timestamp to a timestamp associated with said remote audio signature. The system may be used to evaluate viewing habits and particularly delayed viewing and program playback manipulation such as Fast-forward, slow-motion, skip, rewind and program abandonment.

19 Claims, 5 Drawing Sheets

Related U.S. Application Data filed on May 16, 2014, provisional application No. 61/994,805, filed on May 16, 2014, provisional application No. 61/994,810, filed on May 16, 2014, provisional application No. 61/994,812, filed on May 16, 2014.

(51) Int. Cl.

| | | |
|---|---|---|
| *G10L 25/27* | (2013.01) | |
| *G10L 25/03* | (2013.01) | |
| *G06F 16/683* | (2019.01) | |
| *G06F 16/951* | (2019.01) | |
| *G06F 16/955* | (2019.01) | |
| *G10L 25/51* | (2013.01) | |
| *G10L 25/18* | (2013.01) | |
| *H04H 60/58* | (2008.01) | |
| *G10L 25/48* | (2013.01) | |
| *G10L 19/018* | (2013.01) | |
| *G10L 15/06* | (2013.01) | |
| *H04R 29/00* | (2006.01) | |
| *H04W 4/021* | (2018.01) | |

(52) U.S. Cl.
CPC .......... *G06F 16/951* (2019.01); *G06F 16/955* (2019.01); *G10L 15/06* (2013.01); *G10L 19/018* (2013.01); *G10L 25/03* (2013.01); *G10L 25/18* (2013.01); *G10L 25/27* (2013.01); *G10L 25/48* (2013.01); *G10L 25/51* (2013.01); *H04H 60/58* (2013.01); *H04R 29/004* (2013.01); *H04W 4/021* (2013.01)

(56) References Cited

U.S. PATENT DOCUMENTS

| | | | |
|---|---|---|---|
| 5,351,075 A | | 9/1994 | Herz et al. |
| 5,659,653 A | | 8/1997 | Diehl et al. |
| 5,802,488 A | | 9/1998 | Edatsune |
| 6,771,885 B1 | | 8/2004 | Agnihotri et al. |
| 6,856,758 B2 | | 2/2005 | Iggulden |
| 7,003,213 B1 | | 2/2006 | Hasegawa |
| 7,013,301 B2 | | 3/2006 | Holm et al. |
| 7,443,807 B2 | | 10/2008 | Cutler |
| 7,451,085 B2 | | 11/2008 | Rose et al. |
| 7,565,104 B1 | | 7/2009 | Brown et al. |
| 8,280,772 B2 | | 10/2012 | Fish |
| 8,452,604 B2 | | 5/2013 | Tischer |
| 8,453,170 B2 | | 5/2013 | Briggs et al. |
| 8,468,357 B2 | | 6/2013 | Roberts et al. |
| 8,561,081 B1 | | 10/2013 | Richards et al. |
| RE45,289 E | | 12/2014 | Goldberg et al. |
| 8,948,895 B2 | | 2/2015 | Weiss et al. |
| 9,094,453 B2 | | 7/2015 | Ady et al. |
| 9,306,689 B2 | | 4/2016 | Weiss et al. |
| 9,332,522 B2 | | 5/2016 | Corbellini et al. |
| 2002/0072982 A1 | | 6/2002 | Barton et al. |
| 2002/0083060 A1 | | 6/2002 | Wang et al. |
| 2002/0099555 A1 | | 7/2002 | Pitman et al. |
| 2003/0039464 A1 | | 2/2003 | Davis et al. |
| 2003/0086341 A1 | | 5/2003 | Wells et al. |
| 2003/0088871 A1 | | 5/2003 | Kimura |
| 2004/0257196 A1 | | 12/2004 | Kotzin |
| 2005/0004797 A1 | | 1/2005 | Azencott |
| 2005/0208913 A1 | * | 9/2005 | Raisinghani .......... H03J 1/0008 455/161.2 |
| 2006/0064721 A1 | | 3/2006 | Del Val et al. |
| 2007/0050832 A1 | | 3/2007 | Wright et al. |
| 2007/0143777 A1 | | 6/2007 | Wang |
| 2007/0183415 A1 | | 8/2007 | Fischer et al. |
| 2007/0183743 A1 | | 8/2007 | Tanikawa et al. |
| 2010/0142715 A1 | | 6/2010 | Goldstein |
| 2010/0226526 A1 | | 9/2010 | Modro et al. |
| 2010/0238304 A1 | | 9/2010 | Miyata |
| 2011/0022633 A1 | | 1/2011 | Bemosky et al. |
| 2011/0055136 A1 | | 3/2011 | Hamilton, II et al. |
| 2011/0085781 A1 | * | 4/2011 | Olson ................. H04N 5/782 386/296 |
| 2011/0087490 A1 | | 4/2011 | Olson |
| 2011/0161419 A1 | | 6/2011 | Chunilal |
| 2011/0289114 A1 | | 11/2011 | Yu et al. |
| 2011/0320202 A1 | | 12/2011 | Kaufman |
| 2012/0029670 A1 | | 2/2012 | Mont-Reynaud et al. |
| 2012/0059495 A1 | | 3/2012 | Weiss et al. |
| 2012/0184372 A1 | | 7/2012 | Laarakkers et al. |
| 2012/0224711 A1 | | 9/2012 | Kim et al. |
| 2012/0265328 A1 | | 10/2012 | Kadirkamanathan et al. |
| 2012/0293329 A1 | | 11/2012 | Cunningham et al. |
| 2012/0315014 A1 | * | 12/2012 | Shuster ............ G06F 17/30817 386/241 |
| 2013/0046542 A1 | | 2/2013 | Papakipos et al. |
| 2013/0071090 A1 | | 3/2013 | Berkowitz et al. |
| 2013/0103810 A1 | | 4/2013 | Papakipos et al. |
| 2013/0139209 A1 | * | 5/2013 | Urrabazo ........... H04N 21/4828 725/109 |
| 2013/0197902 A1 | | 8/2013 | Nazarian |
| 2013/0202128 A1 | | 8/2013 | Jain et al. |
| 2013/0205318 A1 | | 8/2013 | Sinha et al. |
| 2013/0245986 A1 | | 9/2013 | Grokop et al. |
| 2013/0290502 A1 | | 10/2013 | Bilobrov et al. |
| 2013/0301706 A1 | | 11/2013 | Qiu |
| 2013/0316679 A1 | | 11/2013 | Miller et al. |
| 2013/0319251 A1 | | 12/2013 | Cheung |
| 2013/0339019 A1 | | 12/2013 | Giancarlo et al. |
| 2014/0046922 A1 | | 2/2014 | Crook |
| 2014/0249771 A1 | | 9/2014 | Yang et al. |
| 2014/0254801 A1 | | 9/2014 | Srinivasan |
| 2014/0278389 A1 | | 9/2014 | Zurek et al. |
| 2014/0282660 A1 | | 9/2014 | Oztaskent et al. |
| 2014/0334644 A1 | | 11/2014 | Selig et al. |
| 2015/0006167 A1 | | 1/2015 | Kato et al. |
| 2015/0104023 A1 | | 4/2015 | Bilobrov |
| 2015/0194152 A1 | | 7/2015 | Katuri et al. |
| 2015/0279381 A1 | * | 10/2015 | Goesnar ............ G06Q 30/0241 704/500 |
| 2015/0296170 A1 | | 10/2015 | Farrell et al. |
| 2015/0331660 A1 | | 11/2015 | Kalampoukas et al. |
| 2015/0331661 A1 | | 11/2015 | Kalampoukas et al. |
| 2015/0332669 A1 | | 11/2015 | Kalampoukas et al. |
| 2015/0332687 A1 | | 11/2015 | Kalampoukas et al. |
| 2016/0179466 A1 | | 6/2016 | Weiss et al. |
| 2016/0316293 A1 | | 10/2016 | Klimanis |
| 2016/0336025 A1 | | 11/2016 | Kalampoukas et al. |

OTHER PUBLICATIONS

Burges, C., Platt, J., Goldstein, J., and Renshaw, E., Name That Tune: Stream Audio Fingerprinting, Microsoft Research, http://research.microsoft.com/en-us/um/people/cburges/rare.htm, 37 pages, USA.

IOS 7: Understanding Location Services, http://support.apple.com/en-us/HT201357, 2015, 4 pages, USA.

Baluja, S. and Covell, M., Content Fingerprinting Using Wavelets, Google, Inc., 2006 3rd European Conference on Visual Media Production, 2006, pp. 198-207, IET, USA.

Baluja, S., Covell, M., and Ioffe, S., Permutation Grouping: Intelligent Hash Function Design for Audio Image Retrieval, Google, Inc., 2008 IEEE International Conference on Acoustics, Speech and Signal Processing, 2008, pp. 2137-2140, IEEE, USA.

Wang, A.L., An Industrial-Strength Audio Search Algorithm, Shazam Entertainment, Ltd., ISMIR 2003, 4th International Conference on Music Information Retrieval, 2003, USA, UK.

Haitsma, J. and Kalker, T., A Highly Robust Audio Fingerprinting System, Journal of New Music Research, 2003, pp. 211-221, India, UK.

Kekre, H.B., Bhandari, N., and Nair, N., A Review of Audio Fingerprinting and Comparison of Algorithms, International Journal of Computer Applications IJCA, vol. 70, No. 13, May 2013, pp. 24-30, USA.

Apple iPhone 3G Specification 2008.

(56) References Cited

OTHER PUBLICATIONS

Zhao et al., "Audio Recording Location Identification Using Acoustic Environment Signature," IEEE Trans. Information Forensics and Security, vol. 8, No. 11, Nov. 2013.
Wikipedia Page ("Principles of Motion Sensing" archived Sep. 6, 2013, hereinafter, Wikipedia).
Android Sensors Overview, Mar. 9, 2014, downloaded from web page: http://developer.android.com/guide/topics/sensors/sensor_overview.html, Downloaded date: Jul. 15, 2015, original posting date: unknown, 13 pages.

* cited by examiner

USER DEVICE
Figure 4B

APPARATUS AND METHOD FOR DETERMINING AUDIO AND/OR VISUAL TIME SHIFT

CROSS REFERENCE TO RELATED APPLICATIONS

This application claims priority under 35 U.S.C. § 119(e) to U.S. Provisional Application Ser. Nos. 61/994,634, 61/994,799, 61/994,805, 61/994,810 and 61/994,812, all filed on May 16, 2014, the entire contents of which are incorporated by reference.

BACKGROUND OF THE INVENTION

1. Field of the Invention

The invention relates to a method for determining time shift between a reference time frame and a media presentation, and particularly determining static and/or dynamic time differences between a reference and an audio playback.

2. Description of the Related Technology

EP 2 501 145 A2 entitled, "Content Provision," is expressly incorporated by reference herein and shows an application where it is useful to identify the audio or video content being presented to a user.

US20130205318 A1 entitled, "Method and system for automatic content recognition based on customized user preferences," is expressly incorporated by reference herein and shows an automatic content recognition (ACR)-enabled connected TV device may be operable to identify, utilizing an ACR system, content in a presented program.

US20130071090 A1 entitled, "Automatic content recognition system and method for providing supplementary content," is expressly incorporated by reference herein and shows automatic content recognition performed to determine the primary digital content. The time of a sample may also be determined. Supplementary digital content is then selected and transmitted to the media device, or to another device, based upon the identified primary digital content. The supplementary digital content may be adapted in layout, type, length, or other manners, based upon the platform and/or configuration of the media device or any other device to which the supplementary digital content is transmitted.

US20110289114 A1 entitled "System and method for auto content recognition," is expressly incorporated by reference herein and shows automatically recognizing media contents by the steps of capturing media content from the Internet and/or devices, extracting fingerprints from captured content and transferring to backend servers for identification, and backend servers processing the fingerprints and replying with identified result.

SUMMARY OF THE INVENTION

According to an advantageous feature of the invention an audio signature may be used to characterize the audio at a location for automatic content recognition.

An Audio Signature is a digital summary, generated from an audio signal, which can be used to identify an audio sample or quickly locate similar items in a database.

An Audio Fingerprint is a condensed digital summary, generated from an audio signal, which can be used to identify an audio sample or quickly locate similar items in an audio database. As used herein, a fingerprint is a special form of a signature.

Automatic content recognition (ACR) refers to the ability to identify a content element within the proximity of a probe or sensor, audio, video or image, based on sampling a portion of the audio, or video, or image, processing the sample and comparing it with a reference.

An apparatus or a server determining time offset of an audio signature from a reference signature time stamp may include a receiver connected to one of more communication channels configured to receive a remote audio signature over the communication channel. A database may have one or more stored reference audio signatures with one or more timestamps stored in the database and associated with one or more of the reference audio signatures. A query engine may be associated with or connected to the database and may be configured to compare a remote audio signature to one or more reference audio signatures stored in the database. A processor may be responsive to the query engine and connected to the database wherein the processor may be configured or programmed to compare a reference timestamp to a timestamp associated with the remote audio signature. The remote audio signature may be an audio fingerprint and one or more of the reference audio signatures may be audio fingerprints. There may be a scheduler configured to schedule remote audio signature generation. The scheduler may be connected to the communication channel configured to transmit a request for a remote audio signature over the communication channel. The scheduler connected to the query engine may be configured or programmed to schedule comparison of a remote audio signature to a reference audio signature. The query engine may be responsive to the scheduler. The query engine may be configured or programmed to prioritize comparison of remote audio signature received over the communication channel to reference audio signatures associated with reference audio signatures matched to remote audio signatures received previously. The reference timestamp may include at least a timestamp relative to an initial reference audio signature timestamp. The processor may be configured or programmed to indicate offset between a reference timestamp and a remote timestamp. The processor may be configured or programmed to indicate changes in offset between a the offset of first remote audio signature and a reference audio signature matching the first remote audio signature and an offset of a subsequent remote audio signature and a reference audio signature matching the subsequent remote audio signature when the reference audio signature matching the subsequent remote audio signature is associated with the reference audio signature matching the first remote audio signature.

In a method for determining time offset of an audio signature from a reference signature time stamp the steps may include comparing a remote audio signature to a reference audio signature associated with a time stamp, comparing a time associated with the remote audio signature to a time stamp associated with a reference audio signature that matches the remote audio signature, and reporting a differential between the time associated with the remote audio signature and a time stamp associated with a reference audio signature that matches the remote audio signature. The remote audio signature may be an audio fingerprint and one or more of the reference audio signatures may be audio fingerprints. The method may include the step of scheduling a remote audio signature generation. The step of scheduling may include transmitting a request for remote audio signature over the communication channel. The method may include the step of scheduling a comparison of a remote audio signature to a reference audio signature. The query engine may be responsive to the scheduler. The step of comparing may prioritize comparison of a remote audio signature received over the communication channel to reference audio signatures associated with reference audio signatures matched to remote audio signatures received previously. The reference timestamp may include at least a timestamp relative to an initial reference audio signature timestamp. The method may include the step of indicating offset between a reference timestamp and a remote timestamp. The step of indicating may include the step of indicating changes in offset between an offset of a first remote audio signature and a reference audio signature matching the first remote audio signature and an offset of a subsequent remote audio signature and a reference audio signature matching the subsequent remote audio signature when the reference audio signature matching the subsequent remote audio signature may be associated with the reference audio signature matching the first remote audio signature.

It is an object of the invention to provide information regarding the relationship of the time difference between a scheduled media stream and when the viewer or listener plays back or consumes the media.

This object may be achieved by establishing a reference database containing audio signatures for programming along with an indication of the programming distribution time. Audio fingerprints may serve as the audio signatures.

It is an object of the invention to facilitate a determination of degree of time-shifting. It is a further object of the invention to determine identification of skipped content.

It is an object of the invention to facilitate determination of replayed content.

It is a further object of the invention to facilitate determination of what portion of content has been consumed by a user.

The invention includes an article of manufacture, a method, a system, and an apparatus for determining time shift.

The article of manufacture of the invention may include a computer-readable medium comprising software for a system for determining time shift, using automatic content recognition. The invention may be embodied in hardware and/or software and may be implemented in one or more of a general purpose computer, a special purpose computer, a mobile device, a server, set top box, or other dedicated or multipurpose device.

The article of manufacture of the invention may include a computer-readable medium comprising software for an automatic content recognition system, comprising code segments for generating audio signatures and storing them with time stamps.

The article of manufacture of the invention may include a computer-readable medium comprising software for an automatic content recognition system, comprising code segments for comparing generated audio signatures and to reference signatures for identification and determining time offset.

The system of the invention may include a computer system including a computer-readable medium having software to operate a computer or other device in accordance with the invention.

The apparatus of the invention may include a computer including a computer-readable medium having software to operate the computer in accordance with the invention.

The article of manufacture of the invention may include a computer-readable medium having software to operate a computer in accordance with the invention.

Various objects, features, aspects, and advantages of the present invention will become more apparent from the following detailed description of preferred embodiments of the invention, along with the accompanying drawings in which like numerals represent like components.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DETAILED DESCRIPTION OF THE PREFERRED EMBODIMENT

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

The system may rely on automatic content recognition technology. One example of the use of automatic content recognition technology is the identification of audio. Automatic content recognition technology can be used to identify media content. Media content can be delivered according to a predetermined schedule. For example, cable or network broadcast stations "play" shows according to a schedule. The shows may include portions which are the episodes, referred to as principle content, and supplemental content such as commercials, emergency alerts and/or news interruptions. The content may be audio and visual, visual only, or audio only. The embodiments of the invention are described in terms of using audio as a representation of audio visual content, but the invention is equally applicable to audio only or video only content. Furthermore the embodiments of the invention are described in the context of sampling audio and generating audio signatures or fingerprints, but is equally applicable to sampling visual content, including video or images, and generating signatures or fingerprints based on the visual samples.

Viewers of scheduled content may, and traditionally have, viewed television content live according to the broadcast schedule of the distributor, such as a network, television station or cable distributor.

Digital video recording services and on-demand content delivery services have become virtually ubiquitous in many households and may take the form of a physical device, a content provider network based service, or a cloud-based service. These video recorders allow viewers to pause streamed broadcasts, rewind or record programming for later playback. The recorders also allow viewers to fast forward and, in some cases, skip content.

According to an advantageous feature of the invention, automatic content recognition may be utilized to identify audio or video content being presented to a user. Automatic content recognition may be used to determine time shift in the consumption of audio and/or visual media content.

Figure 1:
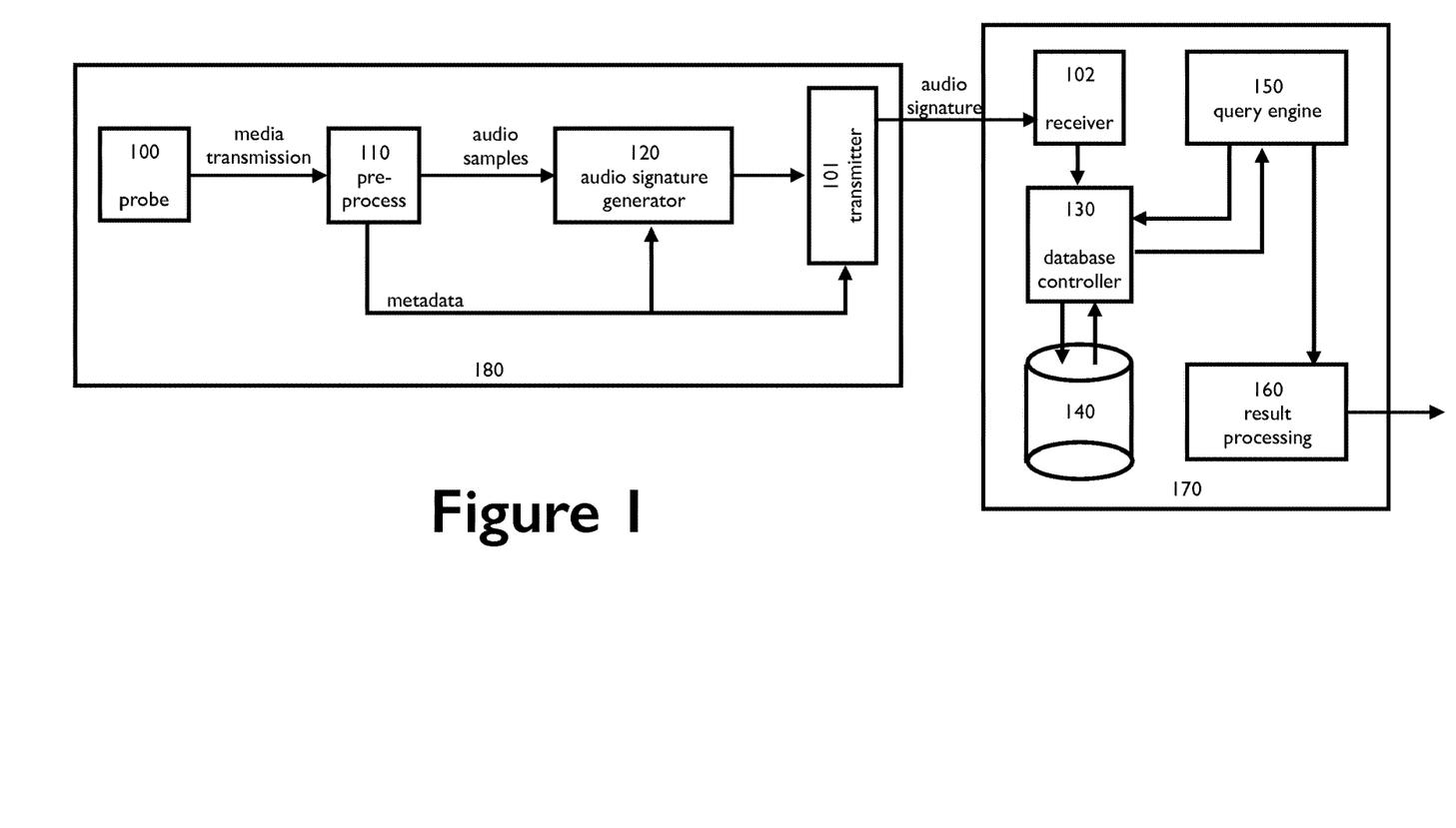
FIG. 1 shows a schematic of a system for automatic content recognition.

FIG. 1 shows a schematic of a system for automatic content recognition. FIG. 1 shows a remote user device 180 which may be associated with an individual or a location. The remote user device 180 may be a device used to collect or process audio information. The remote user device 180 may be a smart phone, tablet or other device.

FIG. 1 shows a remote user device 180 having a probe 100 which may be used to collect information for use in automatic content recognition. The information may include audio information and other information that is metadata related to the collected audio or associated with the remote user device or user. The probe may comprise more than one component depending on what components would be useful to collect the information. The probe may include a microphone, clock or time stamp generator, camera, GPS sensor or other elements for location services or temperature sensor and may have access to other device information such as user identification, serial number and MAC address, and time.

According to an embodiment, the probe may be embodied in a smartphone or tablet which may be associated with a user. Other devices embodying a probe may include dedicated devices, personal computers (PCs), or set-top boxes which have a microphone and/or camera to collect audio and/or video information. The probe may utilize an internal clock or a network accessible clock to generate a time stamp. Smartphone devices provide ready access to location services and other parameters which are known or derived by the probe device or accessed over a communications channel. Apple Support Note HT5594, the content of which is incorporated herein, accessible at http://support.apple.com/kbHT5594, describes location services available to an iOS device.

The information may be processed in order to format and segregate the information. Formatted data representative of an audio or video presentation may be processed by pre-processor 110. The pre-processor advantageously is running on the same device as the probe and may be in the form of an app on a smartphone or tablet or distributed in the form of a library that can be embedded in other apps. The pre-processor may be a component of an app running on a user's smartphone or tablet. For example, the pre-processor may control audio sampling to collect digital information representative of audio.

The remote user device may capture audio information using a component to "listen" to audio being played or present in the location of the remote user device 180. According to an advantageous feature, capturing may be accomplished by audio sampling. The audio samples may be transmitted to a server as captured, or a signature may be generated which may then be transmitted to a server location. The signature may be an audio fingerprint and may include metadata.

The remote user device need not be in the same location as a server. The remote user device 180 may be a cellphone or a tablet device. Smartphones such as an iPhone or Android-based device may serve as the remote user device. Some remote user devices may be stationed at a location. The stationed remote user devices may be implemented in or combined with a set-top box, media server, and home computer or DVD/Blu-ray player.

The server may operate to correlate the audio information received from a remote user device and reference information stored in a database to identify or characterize the audio information. The reference may include audio signatures or audio fingerprints and metadata for one or more streams of audio and/or visual programming, and may include identification of content and content class, such as principle content or supplemental content.

This information may be useful for many purposes including, without limitation, to feed supplemental media to a user or user device, to price audio content delivery, for analytic or other purposes. These and other objects may be achieved by a system according to the invention.

FIG. 1 shows a diagram of an automatic content recognition ("ACR") system. Automatic content recognition can be used in many applications where it is desirable to identify audio information.

The pre-processor may pass the formatted audio samples to an audio signature generation unit. There are a number of ways to generate an audio signature. For example, U.S. Pat. No. 8,468,357 entitled, "Multiple Step Identification of Recordings" is expressly incorporated herein by reference. U.S. Pat. No. 8,468,357 discloses a method and system where algorithmically-determined fingerprints are extracted from audio information utilizing one or more fingerprint extraction methods. An audio fingerprint may be used as an audio signature. The fingerprint may be less unique than an uncompressed signature, but has the benefit of conserving transmission bandwidth and computational resources used for comparison to a reference data-set.

U.S. Pat. No. 8,453,170 B2 entitled, "System and method for monitoring and recognizing broadcast data," is expressly incorporated by reference herein and shows an automatic content recognition (ACR) system.

The audio signature generation 120 may be advantageously executed on the same device as the probe 100 and the pre-processor 110. Advantageously that device is a user's cellphone, smartphone or tablet. The audio signature created by audio signature generator 120 and the metadata segregated by pre-processor 110, if any, may be combined and transmitted by transmitter 101 to a server 170. A time stamp may be associated with the audio signature by the remote user device 180. Alternatively, a times stamp may be associated with an audio signature by the server 170 upon receipt of the signature.

The server may include a receiver 102 receive an audio signature and a database controller 130. The receiver receives audio signatures and any metadata associated with the audio signatures that is transmitted by a remote user device 180. The receiver 102 may associate a time stamp with an audio signature. The database controller 130 may advantageously format the audio signature and associated metadata, if any, for storage in a database 140. The database controller 130 may also inform a query engine 150 of the signature or the signature received from a user device 180 ("query audio signature") and metadata. The query engine 150 can advantageously access the database 140 in order to find reference signature(s) corresponding to the query audio signature from a remote user device 180 which resulted in the signature. When an audio signature is matched, some or all of the metadata and or audio signature may be passed to a result processing module 160 which is able to make use of the identification of the content and metadata.

The database 140 may contain reference audio signatures. The audio signature received from a remote user device 180 may be used to query the database 140. The reference audio signatures may be audio fingerprints. The metadata may include information identifying the content corresponding to the audio signature, distribution time and locations, and/or any other useful metadata.

EP 2 501 145 A2 is expressly incorporated by reference herein and shows that the identification of the content may be utilized to serve supplemental content to a user. The result processing system 160 may, for example, be a content augmentation service.

The remote user device 180, as previously discussed, may be utilized to monitor audio information at a user location. A device 180 may also be provided to monitor reference content and generate reference audio fingerprints and audio signatures with metadata which may be passed to the database controller 130 and stored in database 140 as a reference. The metadata may be a time stamp, an indication of the identification of the reference content or an indication of the device that captures the content. If the audio signature derived at a user device 180 matches a reference audio signature stored in the database, with an acceptable level of confidence, then the server 170 may use the metadata associated with the reference audio signature and/or associated with the captured device audio signature or derive the identification of the media content monitored by the remote user device 180.

Figure 2:
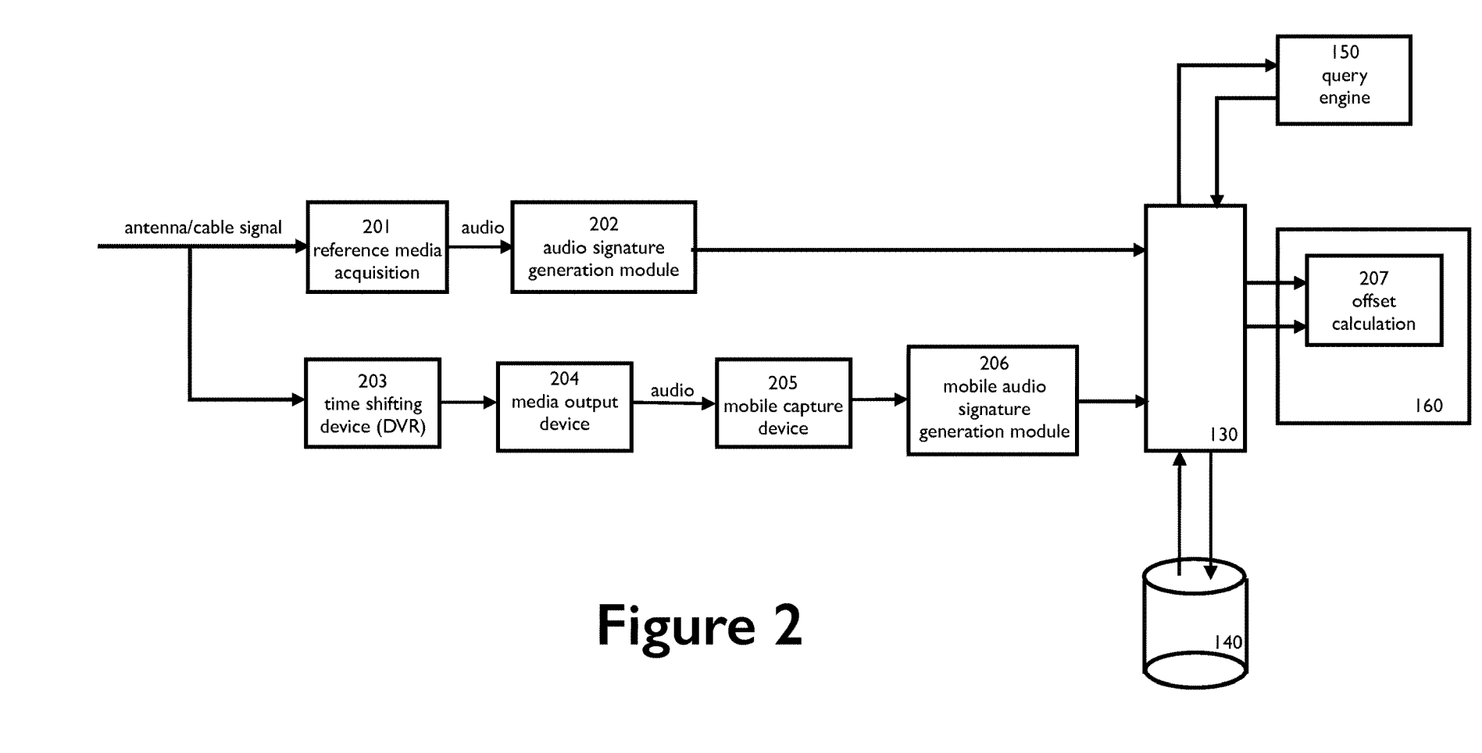
FIG. 2 shows a schematic of an embodiment of a system utilizing automatic content recognition to determine media consumption time offsets.

FIG. 2 shows an example of an embodiment of an application utilizing automatic content recognition to determine time-shift between media content distribution and user consumption of the media. User consumption is inferred when a remote user device 180 such as a personal computing device is associated with a user and is exposed to media content. For example, it is assumed that a user is watching a television program when a cellphone or tablet device associated with that user captures audio and/or video information.

The received audio information may be matched to reference audio information for a determination of the differences between the distributions or broadcast schedule and the capture of the audio by a remote user device 205. The differences may include identification of time differential, identification of running time differential, identification of scheduled audio which was consumed by the viewer and identification of scheduled audio that was skipped. The differences may also include identification of repeated audio.

FIG. 2 shows a reference media acquisition device 201 that may receive broadcast content, live or in advance of broadcast. The broadcast content can be sampled and the samples used to generate audio signatures for use in a database as reference entries. The audio signatures may be audio fingerprints. The audio signature generation module 202 may generate an audio signature from the broadcast content, by sampling the audio of the broadcast content, pre-processing the audio, collecting metadata, and generating an audio signature. According to an additional feature the audio signature may be condensed to an audio signature that is an audio fingerprint. The reference media acquisition module 201 may acquire metadata such as channel, time stamp and content name. The audio signature generation module may be connected to the database controller 130. The database controller may operate to add the reference audio signature and associated metadata to the database 140. The broadcast content may be signals such as over the air media distribution, cable media distribution or other transmission. Alternatively, the reference media may be an independent direct feed from a media provider, or it may be stored content provided in advance of general distribution.

The reference media acquisition module may obtain, generate or segregate metadata describing the media. The metadata may include media identification, broadcast time, identification of distribution channel, identification of the provider, as well as information related to the shows (title, actors, duration), nature of the show (movie, trailer, news, commercial, etc.). The audio signature generation module 202 advantageously generates an audio signature indicative of a sampled portion of the media content suitable for use as a reference for automatic content recognition. The audio signature generation module 202 may generate an audio fingerprint which is a condensed digital summary, generated from an audio signal, which can be used to identify an audio sample or quickly locate similar items in an audio database to serve as a reference for the purpose of identification of the media content.

FIG. 2 shows a time shift device 203 which is utilized to provide media content to a user at the direction of the user. The time shift device 203 may be capable of providing media to a user upon its distribution, or at some time after its original distribution. The time shift device 203 may be a media recording device such as a digital video recorder or an audio recorder. The time shift device 203 may be a set-top box with pause and rewind features commonly available to consumers. Another form of time shift device 203 may be cable system on-demand programming infrastructure. A cable or distribution system may provide its customers with an "on-demand" capability which allows users to select media content from a library or repository. The media content may be in the form of previously broadcast or distributed programming.

The time shift device 203 may be controlled by a user to transfer content to a media output device 204. The media output device 204 may be an audio/video display system such as a monitor or television display. The media output device 204 may also and/or alternatively be an audio output device such as an audio receiver or home audio system.

When media is being played a probe may collect audio and/or video information. As described in connection with FIG. 1, the probe may be embodied in a remote user device such as a smart phone, tablet, or other computing device. The remote user device may be implemented in a PC, a set-top box or other device.

The mobile capture device 205 may be connected to a mobile audio signature generation module 206. The mobile audio signature generation module 206 may generate an audio signature from the remote content, by sampling the audio of the remote content, pre-processing the audio, collecting metadata, and generating an audio signature. According to an additional feature the audio signature may be condensed to an audio signature that is an audio fingerprint. The mobile audio signature generation module 206 may acquire metadata such as time stamp and device identification. The mobile audio signature generation module 206 may be connected to the database controller 130.

Advantageously, the mobile audio signature generation module 206 resides on the user device and may perform the functions of the preprocessing module 110 and audio signature generation module 120. The mobile audio signature generation module 206 may transmit the audio signature and metadata to a database controller 130. The metadata may advantageously include at least a reference to the time of capture of the audio sample.

The query engine 150 in cooperation with the database controller 130 and the database 140 may advantageously identify the content captured by the mobile capture device by comparing the audio signature of the mobile captured audio to a reference audio signature stored in the database.

Result processing module 160 may include an offset calculation module 207. The offset calculation module operates to determine the time difference between the intended distribution time of a sample of the reference content and the captured time of an audio sample corresponding to the reference content. According to a preferred embodiment, the time difference is determined using metadata associated with a reference audio signature and metadata associated with a captured audio signature.

Figure 3:
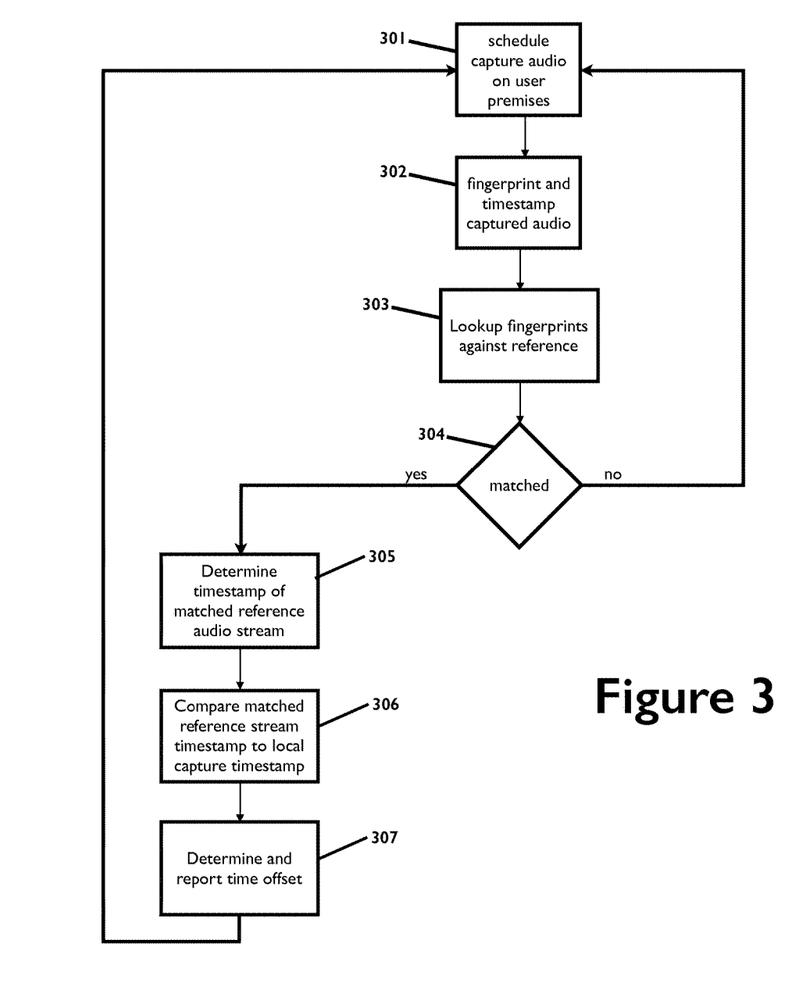
FIG. 3 shows a process flow diagram of an embodiment for determining media consumption time shifts utilizing automatic content recognition.

FIG. 3 shows an example of the method for determining time-shift associated with audio playback. A remote user device 180 may establish a schedule to capture audio on user premises at 301. User premises refers to the location of the remote user device 180. The capture may be an audio sampling technique.

Data representative of the captured audio, i.e. samples, may be processed to generate an audio signature and timestamp of the captured audio at 302. The audio signature and timestamp is advantageously generated on a remote user device 180. An audio signature and timestamp may then be transmitted to a server 170.

The server 170 may execute a query to look-up audio fingerprints generated from audio by a remote user device 180 against reference audio signatures at 303. If the server 170 is unable to identify a match between the captured audio signature and a previously-stored reference audio signature with a sufficient level of confidence at 304, then control is passed back to a process for scheduling audio capture of audio at user premises 301.

According to the embodiment illustrated in FIG. 3, if process 304 identifies a matched reference, process 305 determines a timestamp of the matched reference audio signature. Advantageously, the timestamp is in the form of metadata associated with the reference audio signature in the database. Process 306 compares the timestamp of the matched reference audio signature to a timestamp associated with the audio signature provided by the remote user device 180.

Process 307 determines and reports the time offset between the reference sample and the sample captured by the mobile capture device. Control is passed back to step 301 to schedule capture of audio on user premises.

The remote user device 180 may capture audio and generate audio signatures for transmission on its own schedule. Audio signatures may be stored by the server 170 when received from a remote user device 180. In this way, the server 170 and remote user device 180 may operate with less interaction and more efficiency.

Figure 4A:
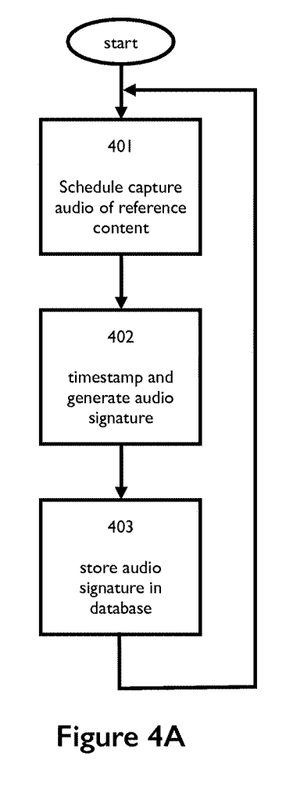
FIGS. 4A, B, and C show a process flow diagram for an embodiment of the invention.
Figure 4B:
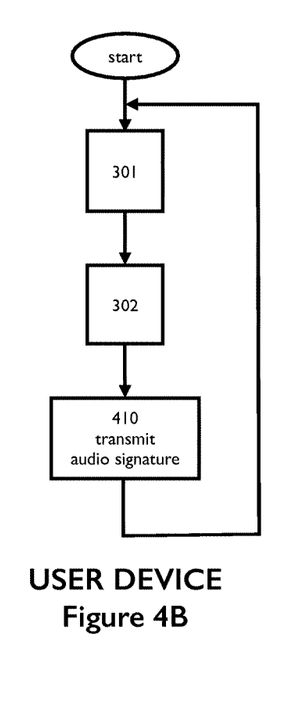
Figure 4C:
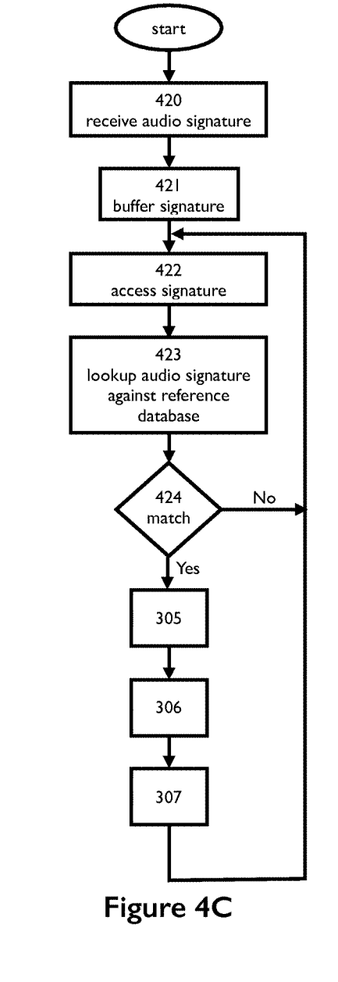

FIGS. 4A, B, and C show a process flow diagram for an embodiment of the invention. FIG. 4A shows a process for establishing a reference database. According to the process flow shown in FIG. 4A, a schedule is established to capture audio of reference content at 401. This audio content may be obtained as distributed or may be obtained in advance. If obtained in advance, advantageously, a distribution time schedule is obtained or established for the content. The schedule may be according to a broadcast time. In fact the reference audio may be obtained and associated with a time schedule at any time before a query is performed. At step 402 an audio signature is generated from the samples captured according to the schedule 401. The signature may be used to generate an audio fingerprint. The metadata may include actual time of broadcast or relative time from start of broadcast. At step 403 the reference audio signatures may be stored in a reference database.

A separate process shown in FIG. 4B may be utilized to generate audio signatures at a remote user location. As described in connection with FIG. 3, a user device 180 may establish a schedule to capture audio on user premises at 301. The capture may be by an audio sampling technique and the samples may be utilized to generate an audio signature at step 302. In addition, metadata may be added to the audio signature to generate at step 302. The audio signature may then be transmitted to a server at step 410.

FIG. 4C shows an example process flow for a server determining user consumption time shift. Step 420 is the reception of an audio signature and metadata from remote user devices. The server may buffer the audio signatures and metadata at step 421 in order to facilitate efficient processing. The server will then access audio signatures when it is available at step 422 and look up the audio signatures against a reference database at step 423.

At step 424 if no match is established, the process may return to step 422 in order to access another audio signature. If a match is established at step 424, process 305 determines a timestamp of the matched reference audio signature. Advantageously, the timestamp is in the form of metadata associated with the reference audio signature in the database to a timestamp associated with the audio signature provided by the remote user device 180. Process 307 determines and reports the time offset between the reference audio signature and the remotely capture audio. Control is then passed back to step 422 to access another audio signature.

According to an embodiment, if no match is identified then the process is dropped. The scheduled capture of audio at user premises 301 may be responsive to a signal received from the server 170, such as an indication that no match was identified or the audio capture may be scheduled by the user device 180.

The reported time offset may be utilized for reasons such as determining playback habits, pause habits, fast forwarding habits, exposure to supplemental content, etc.

Figure 5:
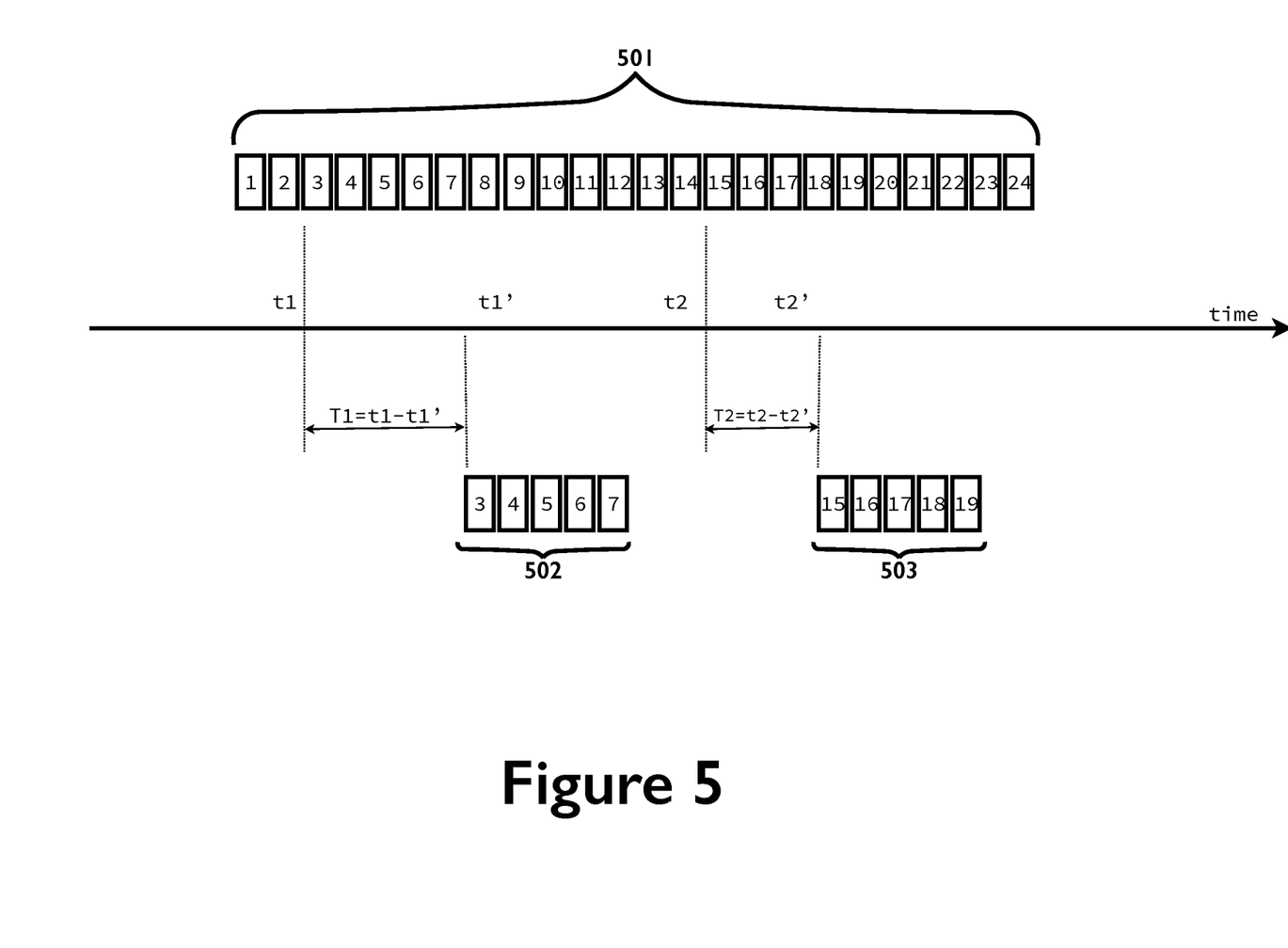
FIG. 5 shows an example of media consumption time shift calculations.

FIG. 5 illustrates the determination of time-shift. A series of audio signatures corresponding to reference samples 501 may be stored in the database 140 along with reference timestamps. Series 501 includes audio signatures 1-24, each corresponding to a sample of captured audio. Captured audio signatures 502 and 503 represent a series of fingerprints corresponding to audio samples received by the remote user device 180. If the query engine determines that captured audio signatures 502, samples 3-7, correspond to reference fingerprints 3-7, the offset calculation module 207 may determine the time difference T1 as the difference between the reference timestamp t1 and the captured timestamp t1' corresponding to audio signature 3.

This system may continue processing audio samples and find that audio signature 503, 15-19, at time t2 corresponds to reference audio signatures 501, samples 15-19 occurring at time t2'. That time difference is determined to be T2.

The series of time-shift values, T1, T2, . . . Tn, may then be reported and be useful for different purposes. The system may be utilized to determine which portions of a media program are viewed, skipped or reviewed. The system may be utilized to determine how much of a media program is consumed and if and when a user abandons a program. The system may be used to determine what time a media program is consumed.

For example if the time difference between corresponding samples changes over the course of consumption, the system may determine the length of time of a pause in viewing, a skipped portion of content, a portion that has been played at an accelerated or decelerated rate (fast-forward or slow-motion) and a portion that is re-wound and viewed again.

The invention is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

Thus, specific apparatus for and methods of auto-populating smart templates with data from multiple sources with structured and unstructured data have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An apparatus for determining time offset of an audio signature from a reference signature timestamp comprising:
   a receiver connected to one of more communication channels configured to receive a remote audio signature over said communication channel;
   a database;
   one or more reference audio signatures stored in said database;
   one or more timestamps stored in said database and associated with one or more of said reference audio signatures;
   a query engine connected to said database and said receiver configured to compare said remote audio signature to one or more reference audio signatures stored in said database and identify a reference audio signature that matches the remote audio signature; and
   a processor responsive to said query engine and connected to said database wherein said processor is configured to compare a reference timestamp to a timestamp associated with said remote audio signature for the matching audio signatures and to output a time offset between the two timestamps,
   wherein the one or more timestamps stored in the database are clock times of an intended distribution time or broadcast time of audio content represented by the one or more reference audio signatures, and wherein the timestamp associated with the remote audio signature is a clock time of captured audio content represented by the remote audio signature.

2. An apparatus according to claim 1 wherein said remote audio signature is an audio fingerprint and one or more of said reference audio signatures are audio fingerprints.

3. An apparatus according to claim 1 further comprising:
   a scheduler configured to schedule a remote audio signature generation.

4. An apparatus according to claim 3 wherein said scheduler is connected to said communication channel configured to transmit a request for remote audio signature over said communication channel.

5. An apparatus according to claim 1 further comprising:
   a scheduler connected to said query engine configured to schedule comparison of a remote audio signature to a reference audio signature.

6. An apparatus according to claim 5 wherein said query engine is responsive to said scheduler.

7. An apparatus according to claim 1 wherein said query engine is configured to prioritize comparison of remote audio signature received over said communication channel to reference audio signatures associated with reference audio signatures matched to remote audio signatures received previously.

8. An apparatus according to claim 1 wherein said reference timestamp includes at least a timestamp relative to an initial reference audio signature timestamp.

9. An apparatus according to claim 1 wherein said processor is configured to indicate changes in offset between the offset of a first remote audio signature and a reference audio signature matching said first remote audio signature and an offset of a subsequent remote audio signature and a reference audio signature matching said subsequent remote audio signature when said reference audio signature matching said subsequent remote audio signature is associated with said reference audio signature matching said first remote audio signature.

10. A method for determining time offset of an audio signature from a reference signature timestamp comprising the steps of:
    comparing a remote audio signature to a reference audio signature associated with a timestamp;

comparing a time associated with said remote audio signature to a timestamp associated with a reference audio signature that matches said remote audio signature; and reporting a differential between the time associated with said remote audio signature and a timestamp associated with a reference audio signature that matches said remote audio signature, wherein the time associated with the remote audio signature is a clock time of captured audio content represented by the remote audio signature, and the timestamp associated with the reference audio signature is a clock time of an intended distribution or broadcast time of audio content represented by the reference audio signature.

11. A method according to claim 10 wherein said remote audio signature is an audio fingerprint and one or more of said reference audio signatures are audio fingerprints.

12. A method according to claim 10 further comprising the step of: scheduling a remote audio signature generation.

13. A method according to claim 12 wherein said step of scheduling further comprises transmitting a request for remote audio signature over said communication channel.

14. A method according to claim 10 further comprising the step of: scheduling a comparison of a remote audio signature to a reference audio signature.

15. A method according to claim 14 wherein said query engine is responsive to said scheduler.

16. A method according to claim 10 wherein said step of comparing prioritizes comparison of a remote audio signature received over said communication channel to reference audio signatures associated with reference audio signatures matched to remote audio signatures received previously.

17. A method according to claim 10 wherein said reference timestamp includes at least a timestamp relative to an initial reference audio signature timestamp.

18. A method according to claim 10 further comprising the step of: indicating offset between a reference timestamp and a remote timestamp.

19. A method according to claim 18 wherein the step of indicating further comprises the step of indicating changes in offset between an offset of a first remote audio signature and a reference audio signature matching said first remote audio signature and an offset of a subsequent remote audio signature and a reference audio signature matching said subsequent remote audio signature when said reference audio signature matching said subsequent remote audio signature is associated with said reference audio signature matching said first remote audio signature.

\* \* \* \* \*